TIMING GENERATOR FOR CATHODE RAY TUBE DISPLAY

Filed Feb. 3, 1967

2 Sheets-Sheet 1

INVENTOR
WALTER C. LANNING

H. H. Losche
Paul S. Collignon
Attorneys

Oct. 14, 1969 W. C. LANNING 3,472,963

TIMING GENERATOR FOR CATHODE RAY TUBE DISPLAY

Filed Feb. 3, 1967 2 Sheets-Sheet 2

INVENTOR.
WALTER C. LANNING

H. H. Losche
Paul S. Collignon
Attorneys

United States Patent Office 3,472,963

Patented Oct. 14, 1969

3,472,963

TIMING GENERATOR FOR CATHODE RAY TUBE DISPLAY

Walter C. Lanning, Plainview, N.Y., assignor, by mesne assignments, to the United States of America as represented by the Secretary of the Navy Filed Feb. 3, 1967, Ser. No. 614,533
Int. Cl. H04l 7/04
U.S. Cl. 178—69.5 4 Claims

ABSTRACT OF THE DISCLOSURE

A timing generator for an airborne cathode ray tube display is disclosed in which all timing signals essential to the generation of the display raster are derived from a single crystal controlled master oscillator. Through a series of divider and gate circuits, vertical and horizontal staircase waveforms and vertical and horizontal sync signals are produced. Additionally, a time slot waveform to facilitate the generation of superimposed symbols on the display is produced.

Figure 1:
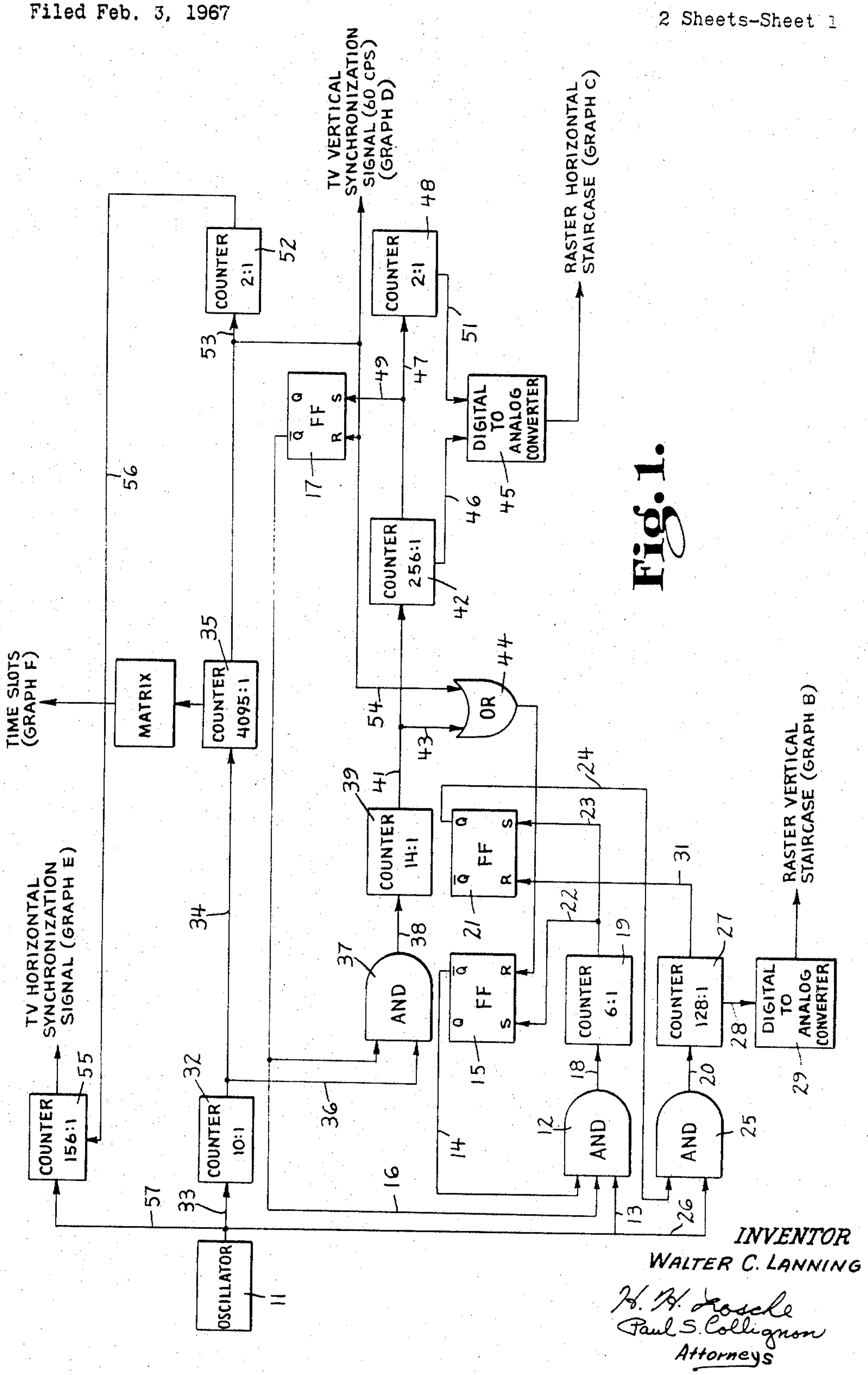

The present invention relates to a timing generator for an airborne cathode ray tube display and more particularly to a raster scan timing generator.

In certain types of airborne cathode ray tube displays, terrain information is presented by means of a raster scanned indicator. By way of example, the data for the raster scan can come from either a scanning radar antenna or a television camera. The antenna or camera can be fixedly mounted to the aircraft frame or can be otherwise stabilized with respect to the earth. Symbolical information must be electronically superimposed on the terrain information.

In numerous device employing cathode ray tubes, a circuit or system is employed to produce a raster on the face of the cathode ray tube. The raster may be defined as a predetermined pattern of scanning lines which provides substantially uniform coverage of an area by successive scans of an electron beam across the face of a cathode ray tube. In commercial broadcast television, for example, a cathode ray tube is used to synthesize the picture for presentation. The intensity of the electron beam is controlled by the variation in magnitude of the signal current, whereas, the electron beam position is controlled by horizontal and vertical sweep circuits. In broadcast television a frame of 525 lines is repeated 30 times a second. A frame may be defined as a single complete picture. Double interlaced scanning is employed in which the electron beam starts from the upper left-hand corner of the cathode ray tube and in $\frac{1}{60}$ second this beam scans 262.5 lines in traveling to the bottom of the cathode ray tube. This is called one field, and a field may be defined as one of the equal parts into which a frame is divided. A second field of 262.5 lines is scanned and these lines lie among the first 262.5 lines in alternate fashion. The two fields taken together represent a frame of 525 lines. The two fields are interlaced, and interlace refers to the method of generating every other line during one downward sweep of the scanning beam and the remaining lines during the next downward sweep. This reduces flicker of the picture. In broadcast television and in certain other systems which employ cathode ray tubes, a horizontal and a vertical deflection system are employed in which the interlace rate, defined as fields per frame, is a fixed number (such as two for broadcast television). The resolution of the raster of a cathode ray tube is determined by the interval number, or lines per frame, produced (such as 525 for broadcast television).

The present invention provides a raster scan generator that has the necessary time accuracy for proper superposition of symbols over the terrain information being depicted, and also there is provided electronic means for raster rolling. Raster rolling is required when an antenna or television camera, as the case may be, is stabilized with respect to the earth so that the presentation will move realistically with the aircraft. In a preferred embodiment of the present invention, the raster generator provides a vertical staircase of 128 counts, a horizontal staircase, a television vertical synchronization, a television horizontal synchronization, and a time slot for symbol generation. All these waveforms are generated from the output of a single crystal oscillator thereby facilitating synchronization. In operation, the horizontal raster is advanced one step prior to the initiation of the vertical sweep and the horizontal raster is not again advanced until the vertical sweep has stopped. Accordingly, there is no horizontal motion of the beam while it is moving vertically.

It is therefore a general object of the present invention to provide an improved timing generator for a cathode ray tube display.

Another object of the present invention is to provide a circuit for developing synchronizing signals which are in accurate time relationship to one another.

Figure 2:
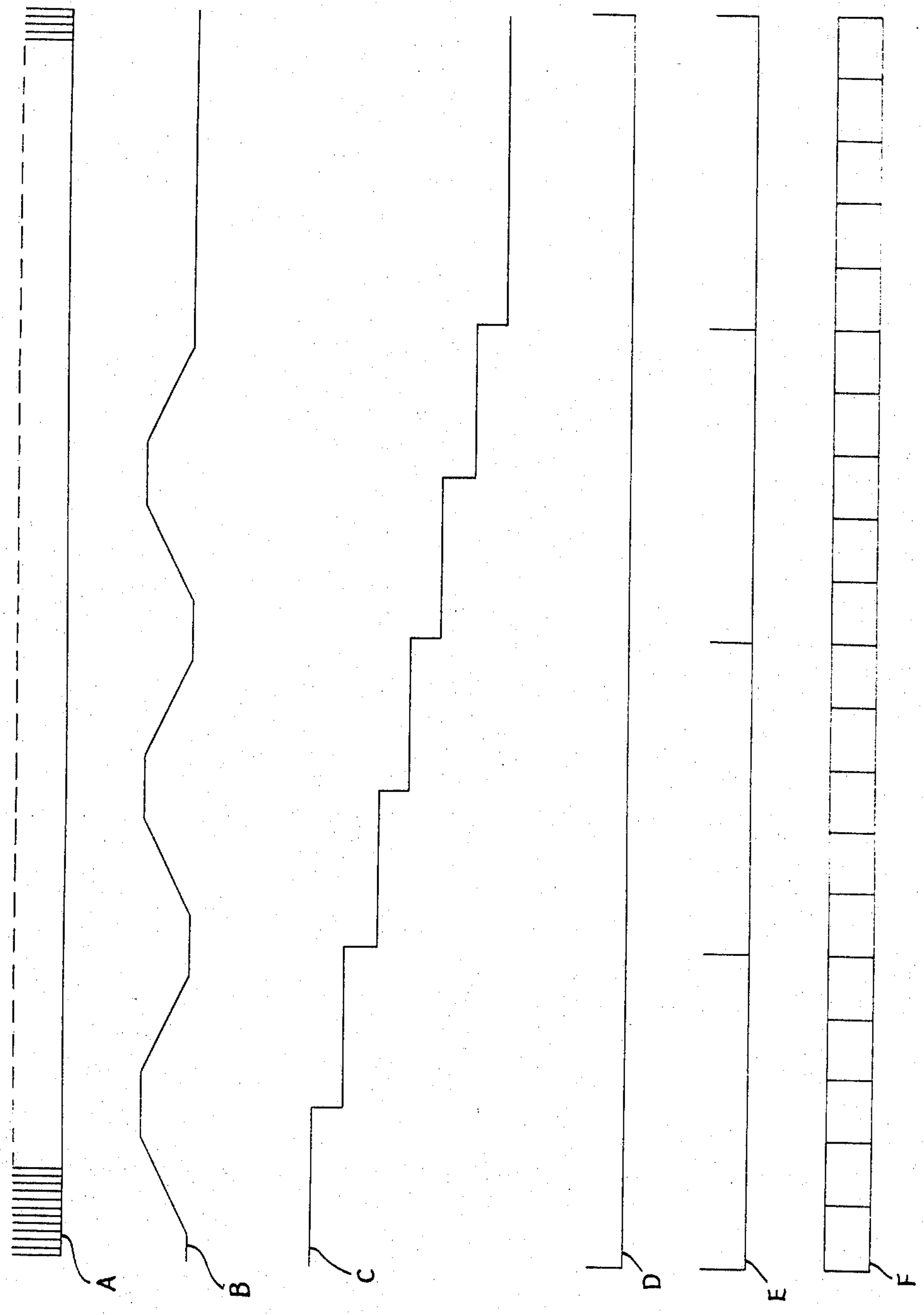

Other objects and advantages of the present invention will be readily appreciated as the same becomes better understood by reference to the following detailed description when considered in connection with the accompanying drawing wherein:

FIGURE 1 is a circuit diagram showing a preferred embodiment of the present invention; and FIGURE 2 is a diagram of waveforms useful in explaining the present invention.

Referring now to FIGURE 1 of the drawing, the raster scan generator provides five output waveforms from crystal oscillator 11. By way of example, crystal oscillator 11 operates at a frequency of 2.457 mc. (graph A) and the first output waveform, which is shown in graph B is a vertical staircase of 128 count. The second output waveform, which is shown in graph C, is a 56.98 microsecond raster horizontal staircase, and the vertical and horizontal rasters are generated so that the horizontal raster is advanced one step prior to the initiation of the vertical sweep, and also the horizontal raster awaits advancement until after the vertical sweep has stopped. The third output waveform, which is shown in graph D, is a 60-cycle television vertical synchronization signal, which is also used to reset the entire generator action. The fourth waveform, which is shown in graph E, is a 15.750 kc. television horizontal synchronization signal. The fifth waveform, which is shown in graph F, consists of 4095 time slots of 4.07 microseconds and is used for symbol generation.

Considering first the raster vertical staircase, AND gate circuit 12 is provided, and has three inputs and one output. One input of AND gate 12 is connected through lead 13 to crystal oscillator 11, another input is connected through lead 14 to an output of flip-flop 15, and the third input is connected through lead 16 to an output of flip-flop 17. By way of example, AND gate 12 and the other AND gates shown in FIGURE 1 of the drawings might be any standard AND gate that will provide a high output when, and only when, all three inputs thereto are high. Flip-flops 15 and 17, as well as the third flip-flop shown in FIGURE 1 of the drawings are devices which each store a single bit of information. The three flip-flops each have two possible inputs, that is, S or set, and R or reset. The flip-flops utilized in the present invention are each well-known bistable devices. These flip-flops have two outputs, (Q and $\overline{Q}$), which are normally of opposite polarity, however, in the present invention only one output of each flip-flop is utilized. When the flip-flop is in the set state, Q is "1," and $\overline{Q}$ is "0," and when the flip-flop is in the reset state, Q is "0," and $\overline{Q}$ is "1."

The output of AND gate 12 is connected through lead 18 to counter 19. Counter 19 develops in its output circuit an impulse for every six pulses applied to its input terminal. The output of counter 19 is connected to both the S input of flip-flop 15 and the S input of flip-flop 21 through leads 22 and 23, respectively. The Q output of flip-flop 21 is connected through lead 24 to one input of AND gate 25, which has a second input connected through lead 26 to oscillator 11. AND gate 25 has only two input terminals, as shown in the drawings, and one output terminal. The output of AND gate 25 is high when, and only when, both inputs are high. The output terminal of AND gate 25 is connected through lead 20 to counter 27 which has two outputs. The first output of counter 27 is connected through lead 28 to a digital to analog converter 29, and each pulse received by counter 27 is passed on to a digital to analog converter 29. The second output of counter 27 is connected through lead 31 to the R input of flip-flop 21. The first output of converter 27 is the vertical staircase of 128 counts as shown in graph B of FIGURE 2 of the drawings. As counter 27, in addition to passing each pulse to converter 29, provides an impulse for every 128 pulses applied to its input terminal, after 128 pulses received by counter 27, an impulse is sent to the R input of flip-flop 21.

Considering now the raster horizontal staircase, a counter 32 is connected through lead 33 to oscillator 11. Counter 32 develops in its output circuit an impulse for every ten pulses applied to its input terminal. The output of counter 32 is connected through lead 34 to the input of counter 35 and also through lead 36 to one input terminal of AND gate 37. Another input of AND gate 37 is connected to the $\overline{Q}$ output of flip-flop 17. AND gate 37 has only two inputs and when, and only when, both inputs are high there is a high output. The output terminal of AND gate 37 is connected through lead 38 to counter 39. Counter 39 develops in its output circuit an impulse for every fourteen pulses applied to its input terminal. The output of counter 39 is connected through lead 41 to counter 42 and also through lead 43 to one input terminal of OR gate 44. Counter 42 has two outputs. The first output passes each pulse received directly to a digital to analog converter 45 through lead 46. The output of converter 45 is the raster horizontal staircase as shown in graph C of FIGURE 2 of the drawings. Counter 42 also provides a second output wherein one impulse is passed for every 256 pulses applied to its input terminal. This second output is applied through lead 47 to counter 48 and also through lead 49 to the S input of flip-flop 17. The output of counter 48, which provides one output pulse for every two input pulses, is also connected to converter 45 through lead 51 and the output of counter 48 provides the interlace bit for the horizontal staircase.

The output of counter 35 is a 60 c.p.s. signal, which is used as a TV vertical synchronization signal, as shown in graph D of FIGURE 2 of the drawings. Counter 35 provides a first output, which is used as the TV vertical synchronization signal, and this first output is also applied to counter 52 through lead 53 and to OR gate 44 through lead 54. The second output of counter 35 is the 4095 time slots which are used for symbol information, and which is shown in graph F of FIGURE 2 of the drawings. Counter 52 provides one output pulse for every two input pulses and this output pulse is applied to counter 55 through lead 56 for reset purposes. Counter 55 receives its input from oscillator 11 through lead 57. Counter 55 provides an output pulse for every 156 pulses applied to its input terminal, and the output of counter 55 is used as the TV horizontal synchronization signal, as shown in graph E in FIGURE 2 of the drawings.

Operation

In describing a complete cycle of the timing generator shown in the embodiment of FIGURE 1 of the drawings, assume initially that gates 12 and 37 are enabled, that gate 25 is disabled and that all flip-flops are in the zero state. The frequency of oscillator 11 is selected at 2.457 mc., which provides a pulse spacing of 0.407 microsecond. The first six pulses from oscillator 11 pass through AND gate 12 to counter 19. When the sixth pulse is received by counter 19, there is a pulse output which sets flip-flop 15 and flip-flop 21 to the "1" state thereby causing AND gate 12 to be disabled and AND gate 25 to be enabled. Upon AND gate 25 being enabled, pulses from oscillator 11 pass through AND gate 25 into counter 27, which has two outputs. One output permits each pulse received to be passed on to converter 29. Counter 27 provides an output pulse after the reception of 128 pulses, and this output pulse is passed to flip-flop 21, which resets flip-flop 21 and thereby disabling AND gate 25. Thus a vertical staircase of 128 counts is provided, as shown in graph B of FIGURE 2 of the drawings. As 6 pulses accumulated prior to enabling AND gate 25, and 128 pulses passed through AND gate 25 before it was disabled, this first action took 134 pulses.

Meanwhile, at the time a pulse was first received at AND gate 12, a pulse was also received at counter 32. After 10 pulses accumulated in counter 32, a pulse output is provided by counter 32. Likewise for every additional 10 pulses, a pulse output is provided. These pulse outputs from counter 32 pass through lead 36 and AND gate 37, which is initially enabled, and accumulate in counter 39. After 14 pulses are received by counter 39, there is a pulse output which is passed to both counter 42 and OR gate 44. It can thus be seen that it has required 140 pulses from oscillator 11 to advance the horizontal raster, and this occurs six pulses later in time than when the vertical raster counter 27 overflowed. Upon a pulse being applied from counter 39 through line 43 and through OR gate 44, flip-flop 15 is reset which again enables AND gate 12 so that it can again pass the next 6 pulses from oscillator 11. Thus, the action is as follows: count 6; start the vertical staircase; count 128 for the vertical staircase; stop the vertical staircase; count 6; advance the horizontal staircase; count 6; start the vertical staircase; etc. The pulse passing through OR gate 44 resets flip-flop 15 after each 140 pulses and it is this pulse that reinitiates the cycle.

As the combination of counter 32 and counter 39 permit one pulse to pass for each 140 pulses emitting from oscillator 11, the frequency of the pulses entering counter 42 is 17.55 kc. (56.98 microseconds) and these pulses are passed directly through counter 42 to converter 45 to provide a 56.98 microsecond raster horizontal staircase, as shown in graph C of FIGURE 2 of the drawings. The second output of counter 42, which provides one pulse out for every 256 pulses in, is connected to both counter 48 and the S input of flip-flop 17. Counter 48, which provides one output pulse for every two input pulses, provides the interlace bit for the raster vertical staircase. When the 256 line raster horizontal staircase is finished, the pulse from counter 42 sets flip-flop 17 thereby disabling AND gate 37.

In addition to the output of counter 32 being connected to AND gate 37, the output of counter 32 is provided as an input for counter 35. Counter 35 provides an output pulse for every 4095 input pulses. The combining of counter 32 and counter 35 is such that one output of counter 35 is a 60 cycle per second signal which is used as the TV vertical synchronization signal as shown in graph D of FIGURE 2 of the drawings. This 60 cycle signal is also used as a reset signal to start the entire action all over again. As shown in FIGURE 1 of the drawings, the reset signal is applied to the R input of flip-flop 17 which causes AND gate 37 to be enabled and also the reset signal is applied through OR gate 44 to flip-flop 15, which causes AND gate 12 to be enabled. It should be noted that this is the condition that was originally assumed in describing the operation of the present invention, namely, that gates 12 and 37 are enabled, that gate 25 is disabled and that all flip-flops are in the zero state. Also the 60 cycle signal from counter 35 is connected to counter 52, which provides an output pulse for every two input pulses. The output of counter 52, which is a 30 cycle signal, is applied as a resulting signal for counter 55.

Counter 55 provides an output pulse for every 156 input pulses, and as the frequency of oscillator is 2.457 mc., then the output frequency of counter 55 is 15.75 kc. which is used as the TV horizontal synchronization signal, as shown in graph E of FIGURE 2 of the drawings. As counter 55 is reset every one-thirtieth of a second, exactly 525 horizontal synchronization pulses occur between reset pulses.

Counter 35, in addition to providing a 60 cycle reset signal, also provides a time slot output as shown in graph F of FIGURE 2 of the drawings. This time slot output, which consists of 4095 slots of 4.07 microseconds, is used for symbol generation.

It can thus be seen that the five output signals, which are shown in graphs B, C, D, E, and F, are all synchronous and are initiated simultaneously by the output of a single crystal oscillator. It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A timing generator for an airborne cathode ray tube comprising:

means for producing pulses, a first divider counter for receiving pulses from said means for producing pulses and providing a counter output after receiving a given minimum number of pulses, a first AND circuit interposed between said means for producing pulses and said first divider counter, a second divider counter for receiving pulses from said means for producing pulses and having a first counter output providing pulses equal in number to said pulses being received, and having a second counter output providing an output after receiving a given minimum number of pulses, a second AND circuit interposed between said means for producing pulses and said second divider counter, first and second flip-flops arranged and controlled by the output of said first divider counter, one output of said first flip-flop being connected to an input of said first AND circuit, one output of said second flip-flop being connected to an input of said second AND circuit, and the second counter output of said second divider counter being connected to the reset input of said second flip-flop, third, fourth, and fifth divider counters connected in series with said means for producing pulses and each providing a first output after receiving a given minimum number of pulses, said fifth divider counter having a second output providing pulses equal in number to the number of pulses received by said fifth divider counter, a third AND circuit interposed between said third and fourth divider counter, means responsive to the output of said fourth divider counter for resetting said first flip-flop, a third flip-flop having an output connected to an input of said third AND circuit and having a set input connected to the first output of said fifth divider counter, means for resetting said first and third flip-flops, means connected to said first counter output of said second divider counter for converting said output to a raster vertical staircase, and means connected to said second counter output of said fifth divider counter for converting said output to a raster horizontal staircase whereby said horizontal raster is always advanced when said vertical sweep has stopped.

2. A timing generator for an airborne cathode ray tube as set forth in claim 1 having means connected to said means for producing pulses for providing a 60 cycle per second TV vertical synchronization signal and having means connected to said means for producing pulses for providing a TV horizontal synchronization signal, said 60 cycle signal also being utilized as said means for resetting said first and third flip-flops.

3. A timing generator for an airborne cathode ray tube as set forth in claim 2 having means for providing time slots for symbol generation.

4. A timing generator for an airborne cathode ray tube as set forth in claim 3 wherein said means for producing pulses comprises a single crystal oscillator.

References Cited

UNITED STATES PATENTS

| | | | |
|---|---|---|---|
| 2,660,615 | 11/1953 | Ellis et al. | 178—7.2 |
| 3,359,367 | 12/1967 | Hiatt | 178—69.5 |

ROBERT L. GRIFFIN, Primary Examiner

ROBERT L. RICHARDSON, Assistant Examiner